A. C. LINDGREN & O. F. SMITH.
HAY LOADER.
APPLICATION FILED AUG. 1, 1911.
1,054,358.
Patented Feb. 25, 1913.
3 SHEETS—SHEET 1.
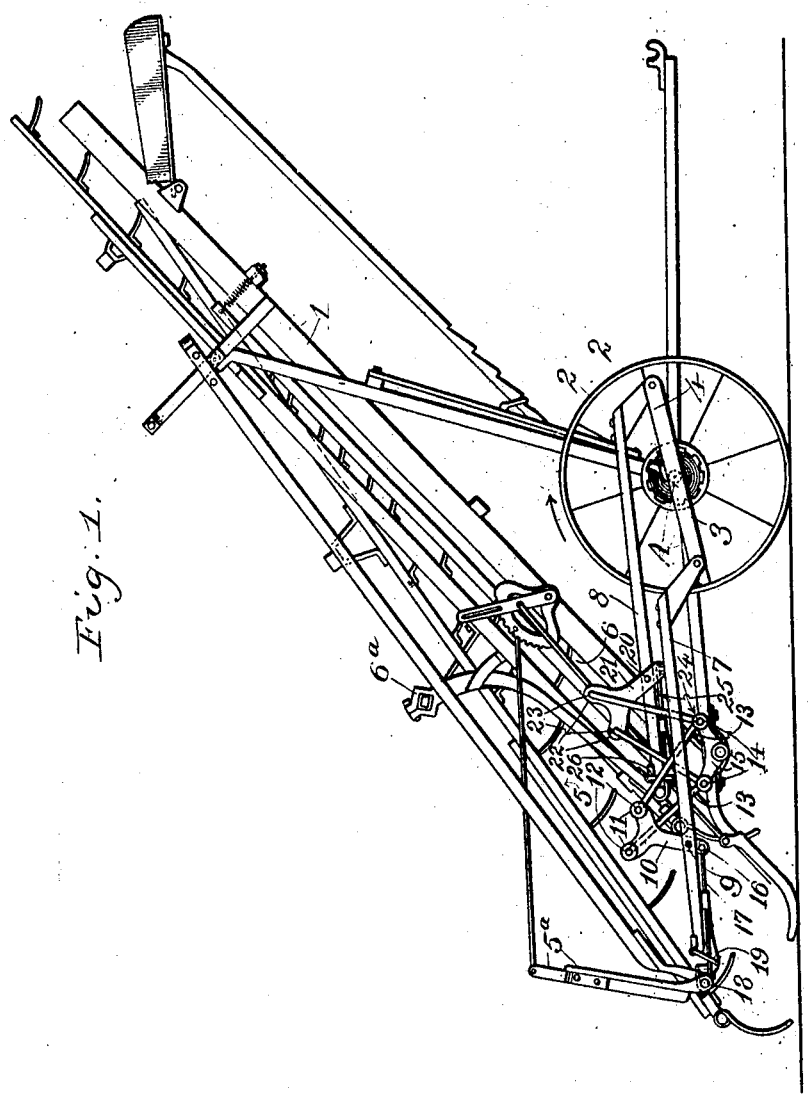
Attest:
L. C. Thomson
M. R. Manning
Inventors:
A. C. Lindgren
O. F. Smith
by Kennedy & Campbell Attys

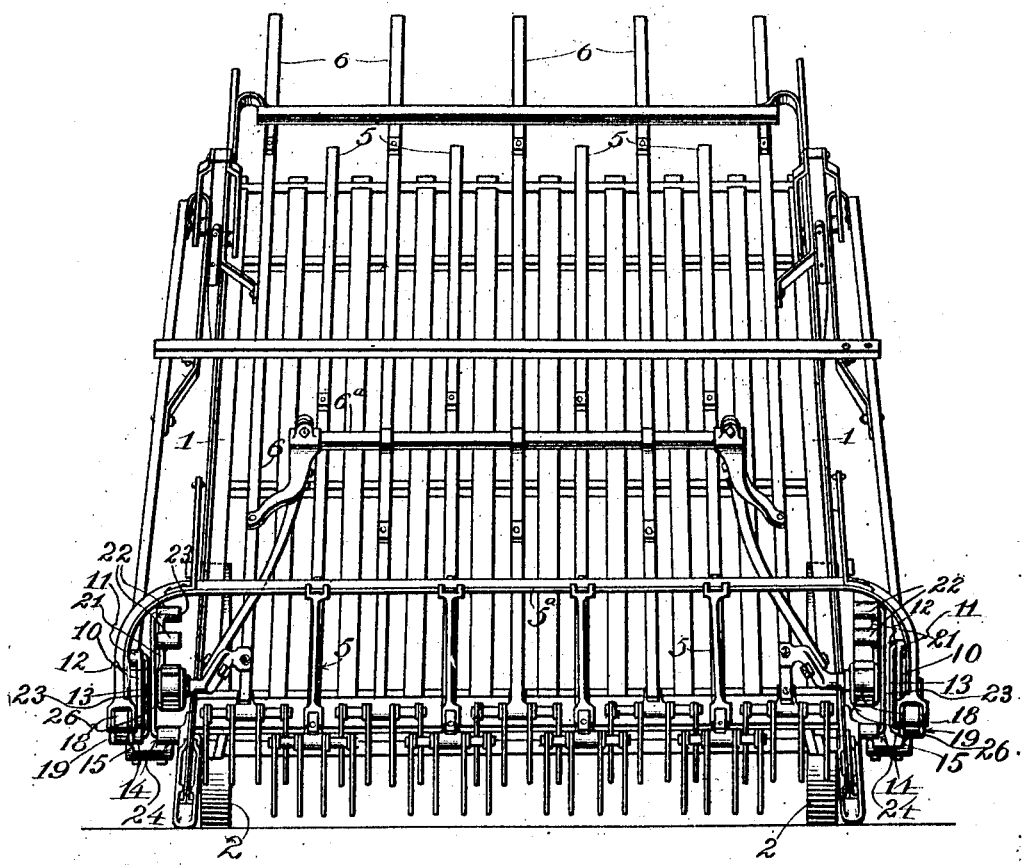

A. C. LINDGREN & O. F. SMITH.
HAY LOADER.
APPLICATION FILED AUG. 1, 1911.
1,054,358.  Patented Feb. 25, 1913.
3 SHEETS—SHEET 3.
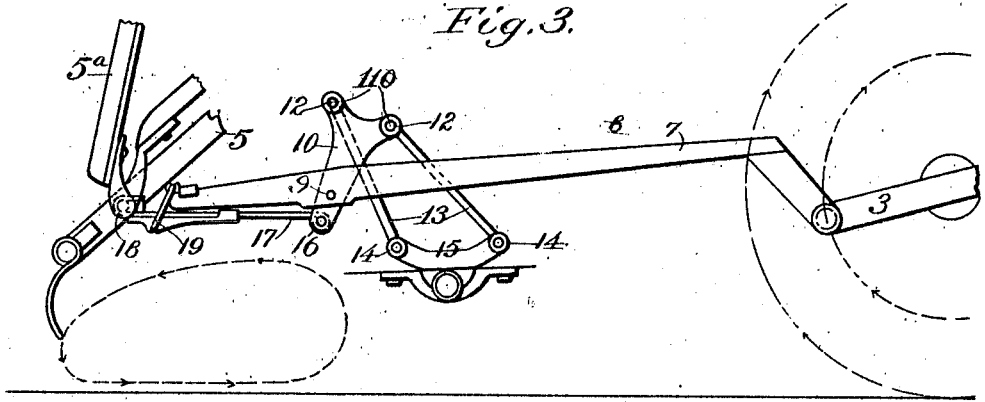
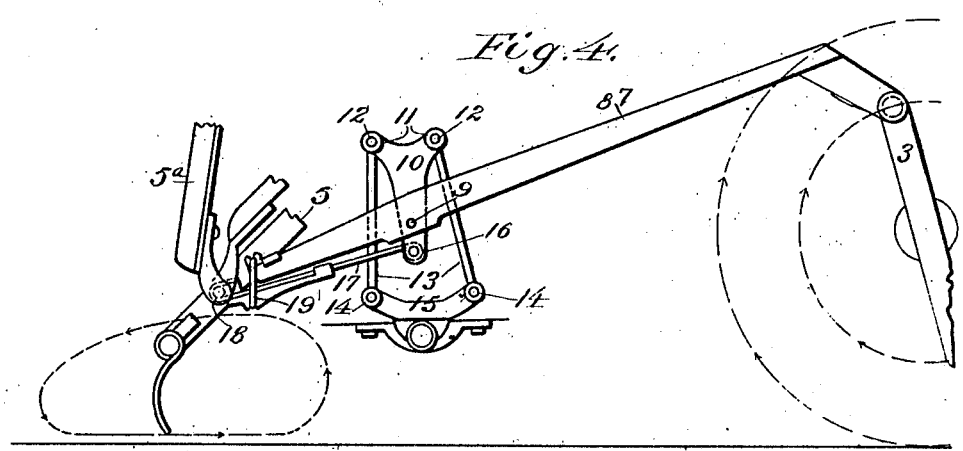
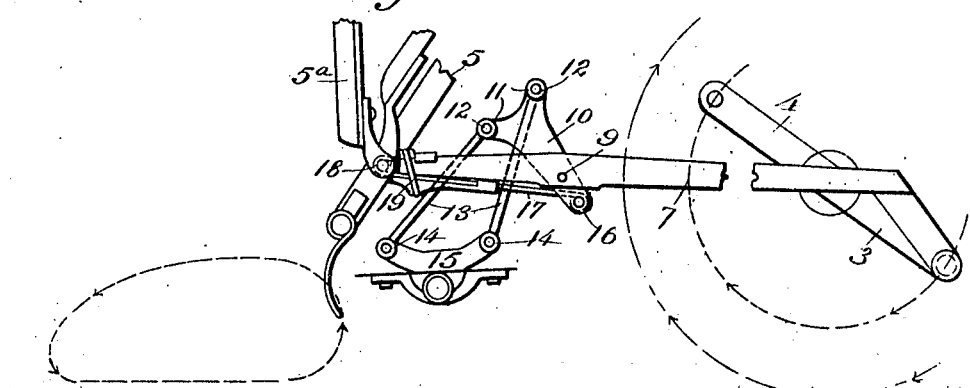
Attest:  Inventors:

UNITED STATES PATENT OFFICE.

ALEXUS C. LINDGREN AND ORBIN F. SMITH, OF MOLINE, ILLINOIS, ASSIGNORS TO MOLINE PLOW COMPANY, A CORPORATION OF ILLINOIS.

HAY-LOADER.

1,054,358.

Specification of Letters Patent.

Patented Feb. 25, 1913.

Application filed August 1, 1911. Serial No. 641,718.

*To all whom it may concern:*

Be it known that we, ALEXUS C. LINDGREN and ORBIN F. SMITH, citizens of the United States, residing at Moline, in the county of Rock Island and State of Illinois, have invented certain new and useful Improvements in Hay-Loaders, of which the following is a specification, reference being had therein to the accompanying drawing.

This invention relates to hay loaders of the type embodying a wheeled elevator frame equipped with reciprocating rake bars driven from the ground wheels in such manner that as the machine is drawn over the field in rear of a wagon, the hay will be gathered and elevated by the rake bars and delivered into the wagon. It has been proposed in machines of this type to drive the rake bars, which are usually arranged in two groups so as to act alternately, from the ground wheels by oppositely disposed cranks arranged alongside the wheels, the cranks being connected with the respective groups of rake bars and acting by their rotation to reciprocate the operating levers, and give the necessary movements to the rake bars to gather and elevate the hay. It is a desideratum in these machines that the raking stroke of the rake bars be as long as possible, but the length of the stroke is limited by the fact that the driving cranks cannot be longer than the radius of the wheel, otherwise in their rotation they would contact with the ground.

It is the aim of our invention to lengthen the effective raking stroke of the rake bars in relation to the length of the driving cranks, or as stated in another way, to enable a shorter driving crank to be used, without shortening the effective length of the raking stroke.

With this aim in view our invention consists in means broadly for so connecting the operating levers with the rake bars that the latter will, as the levers are operated, move relatively thereto to lengthen the raking stroke.

In the accompanying drawings: Figure 1 is a side elevation of a hay loader with our invention embodied therein. Fig. 2 is a plan view of the same. Fig. 3 is an elevation on an enlarged scale of the rake bar operating mechanism, showing the rake bars at the beginning of their forward raking stroke. Fig. 4 is a similar view showing the position of the parts after the rake bars have partially completed the raking stroke. Fig. 5 is a similar view showing the position of the parts when the rake bars are at the forward end of the raking stroke.

Referring to the drawings: 1 represents a suitable elevator frame, upwardly inclined as usual, and supported by ground wheels 2—2, mounted on an axle A, to which latter is fixed at opposite ends, pairs of oppositely disposed driving cranks 3—3, 4—4, which cranks are arranged at the outer sides of the wheels. Arranged over the elevator frame so as to coöperate therewith, are a series of rake bars, arranged in two alternately acting groups 5 and 6, the bars of the group 5 being connected together by a transverse bar 5ª, while the rake bars of the group 6 are likewise connected together by a transverse bar 6ª. At its ends the transverse bar 5ª is operatively connected with operating levers 7—7, one on each side of the machine, which operating levers are in turn connected with the cranks 3—3, whereby the rotation of the cranks will operate one group of rake bars. The ends of the transverse bar 6ª are operatively connected with operating levers 8—8, arranged respectively alongside the other operating levers, one on each side of the machine, which levers are connected at their forward ends with the other pair of driving cranks 4—4, by which mechanism the group 6 of rake bars is driven.

The foregoing parts may be of any approved and appropriate construction, as they in themselves form no part of the present invention. Our invention is concerned with the connections between the groups of rake bars and their respective operating levers, said connections being of a character to cause the rake bars, when the operating levers are reciprocated, to move relatively to said levers, in the direction of their reciprocation, the result being that the raking stroke will be lengthened with reference to the movements of the levers. Inasmuch as the construction of this mechanism is the same on opposite sides of the machine, a description of one set of devices will suffice.

Between its ends the operating lever 7 is mounted to rock on a stud 9 projecting outwardly horizontally from the lower end of a vibrating element in the form of a hanger 10, the upper end of which is formed with two horizontal outwardly projecting hollow studs 11—11, in which are loosely mounted the upper outwardly turned ends 12—12 of links 13—13 constituting a swinging support for the hanger. The lower ends of these links are extended outward horizontally and mounted loosely in bearing openings 14—14, formed in the opposite ends of a bracket plate 15 at its outer side, which bracket plate is fixed to the side of the elevator frame. The hanger 10 is extended below the stud 9 and has its lower extremity pivoted as at 16 to the forward end of a plate 17, which extends rearwardly beneath the operating lever to the rear end of the same, where it is jointed on a horizontal transverse axis 18 to the end of a cross bar 5$^a$ of the group of rake bars 5 before alluded to. Near its rear end the plate is suspended from the end of the lever by means of a stirrup 19 in such manner that the plate may move longitudinally with relation to the lever, as the latter is reciprocated back and forth by the rotation of its driving crank.

Referring to Fig. 5, the rake bars are shown as at the forward end of the raking stroke, in which position of the parts the links 13—13 are inclined upwardly and forwardly and the hanger 10 inclined forwardly and downwardly, with the plate 17 shifted to its forward position with reference to the operating lever. When the crank is now rotated in the direction of the arrow in Fig. 5, the operating lever will be shifted in a rearward direction, by which motion the links 13—13 will be swung to the rear and the hanger 10 likewise shifted to the rear. In such shifting movement, the hanger will rock on the stud 9 on the lever 7, which rocking motion of the hanger will, as the rearward movement of the lever is completed, shift the plate 17 relative to the lever and longitudinally thereof, the result being that the rake bars will be moved rearwardly and relative to the levers, and in this manner the effective stroke of the rake bars will be increased by an amount equal to this relative movement of the rake bars. The parts are now in the position shown in Fig. 3, the rake bars being at the rear end of the raking stroke. On the continued movement of the crank in the direction of the arrow in Fig. 3, the operating lever will be drawn forwardly and the links 13—13 swung in a corresponding direction, thereby carrying the hanger 10 in a forward direction and causing the same to rock relative to the lever on the stud 9, the position of the parts when the lever has thus partially completed its forward stroke being shown in Fig. 4, in which it will be seen that the plate 17 has, by the rocking motion of the hanger relative to the lever, been shifted forwardly relative to the lever from its extreme rear position of Fig. 3. The further movement of the crank in the direction of the arrow in Fig. 4, now carries the parts again to their original position as shown in Fig. 5, in which final movement, the plate 17 will, by the rocking action of the hanger on the lever, be shifted to its former extreme forward position relative to the lever. It is seen, therefore, that by the reciprocating movements of the lever, due to the rotation of its driving crank, the rake bars in moving to the rear to begin their forward raking stroke, are shifted rearwardly, relative to the lever and in this manner the effective raking stroke is correspondingly lengthened.

The operating lever 8 for the other group of rake bars 6 is connected to and operated by its crank and supporting hanger and links, in precisely the same manner as that described, the only difference being that the parts are so related that the actions of the two groups of rake bars will alternate with each other, one group moving forwardly as the other retreats. The lever 8 is mounted between its ends on a stud 20 projecting inwardly from the lower end of a vibrating hanger 21, the upper end of which is provided with two inwardly projecting horizontal hollow studs 22—22 in which are loosely mounted the upper inwardly turned ends of links 23—23. The lower ends of these links are extended horizontally inwardly and mounted loosely in horizontal bearing openings 24—24 in the opposite ends of the bracket plate 15 before alluded to. The lower end of the hanger is extended below its pivotal stud and jointed to the forward end of a shifting plate 25 extending beneath the lever 8 and jointed at its rear end to the connecting bar 6$^a$ of the group of rake bars 6, this plate being suspended at the rear end of the lever by a stirrup 26, similar in construction and arrangement to the stirrup 19 already described. As a result of this mechanism, the group of rake bars 6 will be operated by its levers 8—8 in a manner similar to the operation of the other group, the plate 25 shifting rearwardly relative to the lever 8 as the rake bars retreat, and thereby lengthening the raking stroke, and the plate moving forwardly relative to the lever as the latter is carried forward by the crank to impart the raking stroke.

In the reciprocating movements of the operating levers, and as a result of their swinging support by the links, and hangers as described, the rake bars in their forward raking stroke will move in a horizontal line, which is that most effective for performing properly the raking action. At the end of the forward raking stroke the bars will move upwardly slightly so that the rake teeth will deliver the gathered hay to the elevator frame, whereupon the bars will move in their return stroke rearwardly in a downward curve.

We believe ourselves to be the first to provide for a movement of the rake bars relative to the operating levers, by means controlled by the operation of the levers, and to this construction it is our intent in the appended claims to lay broad claim. It is manifest, however, that the details of construction for effecting this result may be variously changed and modified without departing from the spirit of the invention, and it will be understood that the invention is not limited to any particular form or construction of the parts except in so far as such limitations are specified in the claims.

Having thus described our invention, what we claim is:

1. In a hay loader, the combination of an elevator frame, raking devices coöperating therewith, operating levers for the raking devices, means for operating said levers, and members connecting the operating levers with the raking devices and constructed to permit of a movement of the raking devices relative to the levers in the direction of the raking stroke of the devices, said members being controlled by the levers and acting when the levers are operated to shift the raking devices relative to the levers in the direction of the raking stroke of the raking devices.

2. In a hay loader, the combination of an elevator frame, raking devices coöperating therewith, reciprocating operating levers for the raking devices, means for operating said levers, and means connecting the reciprocating levers with the raking devices and constructed to permit of a movement of the raking devices relative to said levers, said means being controlled by the operation of the reciprocating levers and acting to move the raking devices relative to the levers in the direction of the raking stroke of the raking devices.

3. In a hay loader, the combination of an elevator frame, raking devices coöperating therewith, operating levers for the raking devices, means for operating said levers in a predetermined path endwise, and connecting devices between the levers and the raking devices, said connecting devices being controlled by the movement of the levers and acting to shift the raking devices relative to the levers in a direction lengthwise of the levers.

4. In a hay loader, the combination of an elevator frame, raking devices coöperating therewith, reciprocating operating levers, members operatively connected with the levers and movable in relation thereto lengthwise of the levers, said members being operatively connected also with the raking devices and adapted when the levers are operated, to shift the raking devices relative thereto to lengthen the raking stroke.

5. In a hay loader, the combination of an elevator frame, raking devices coöperating therewith, reciprocating operating levers, members operatively connected with the levers and movable relatively thereto, to lengthen the rake stroke and operatively connected also with the raking devices, and movable supporting means connected with said members.

6. In a hay loader, the combination of an elevator frame, raking devices coöperating therewith, a reciprocating operating lever, a member operatively connected with the lever and movable in relation thereto and operatively connected with the raking devices, and swinging means supporting the lever and jointed to said movable member.

7. In a hay loader, the combination of an elevator frame, raking devices coöperating therewith, a reciprocating operating lever, a member operatively connected with the lever and movable in relation thereto and operatively connected with the raking devices, a swinging hanger pivoted to the reciprocating lever and pivoted also to said movable member, and a swinging support pivoted to the said hanger and to the frame of the machine.

8. In a hay loader, the combination of an elevator frame, raking devices coöperating therewith, a reciprocating operating lever, a member operatively connected with the lever and movable in relation thereto, a hanger pivoted to the lever and to said movable member, and a link pivoted to the frame of the machine and to the hanger.

9. In a hay loader and in combination with an elevator frame, raking devices coöperating therewith, a reciprocating operating lever for the raking devices, swinging links pivoted to the frame of the machine, a hanger pivoted to the links and pivoted also to said operating lever, and a member carried by the operating lever and pivoted to the hanger, said member being movable relatively to the operating lever and operatively connected with the raking devices.

10. In a hay loader, the combination of an elevator frame, raking devices coöperating therewith, a pivotally supported element, an operating lever pivotally connected with said element, means for operating the lever, and a member pivoted to said element at a point a greater distance from the axis of said element than the connection of the lever therewith, said member being operatively connected with the raking devices.

In testimony whereof we affix our signatures in presence of two witnesses.

ALEXUS C. LINDGREN.
ORBIN F. SMITH.

Witnesses:
L. C. BLANDING,
JAMES J. LAMB.